United States Patent
Baar et al.

(10) Patent No.: US 10,403,214 B2
(45) Date of Patent: Sep. 3, 2019

(54) ELECTRONIC DEVICES WITH TONE MAPPING TO ACCOMMODATE SIMULTANEOUS DISPLAY OF STANDARD DYNAMIC RANGE AND HIGH DYNAMIC RANGE CONTENT

(71) Applicant: Apple Inc., Cupertino, CA (US)

(72) Inventors: Teun R. Baar, San Francisco, CA (US); Nicolas P. Bonnier, Campbell, CA (US); Jiaying Wu, San Jose, CA (US); Marc Albrecht, San Francisco, CA (US)

(73) Assignee: Apple Inc., Cupertino ( * ) Notice: Subject to any disclaimer, the term of this patent is extended or adjusted under 35 U.S.C. 154(b) by 51 days.

(21) Appl. No.: 15/814,262

(22) Filed: Nov. 15, 2017

(65) Prior Publication Data
US 2018/0330674 A1 Nov. 15, 2018

Related U.S. Application Data

(60) Provisional application No. 62/505,670, filed on May 12, 2017.

(51) Int. Cl.
*G09G 3/34* (2006.01)
*H05B 37/02* (2006.01)
(Continued)

(52) U.S. Cl.
CPC ........... *G09G 3/3406* (2013.01); *G06T 5/009* (2013.01); *G06T 11/001* (2013.01); *H05B 33/086* (2013.01); *H05B 37/0218* (2013.01); *G09G 2320/0242* (2013.01); *G09G 2320/0271* (2013.01); *G09G 2320/0626* (2013.01); *G09G 2320/0666* (2013.01); *G09G 2330/021* (2013.01); *G09G 2330/045* (2013.01); *G09G 2360/144* (2013.01); *G09G 2360/16* (2013.01)

(58) Field of Classification Search
USPC .......................................... 345/589; 382/254
See application file for complete search history.

(56) References Cited

U.S. PATENT DOCUMENTS 7,643,035 B2  1/2010  Toyama et al.
9,524,676 B2  12/2016  Bi et al.
(Continued)

*Primary Examiner* — Wesner Sajous
(74) *Attorney, Agent, or Firm* — Treyz Law Group, P.C.; G. Victor Treyz; Kendall W. Abbasi

(57) ABSTRACT

An electronic device may be provided with a display. Standard and high dynamic range content may be produced by content generators operating on control circuitry. In a first mode of operation, standard dynamic range content is displayed. In a second mode of operation, high dynamic range content is displayed. In a third mode of operation, standard dynamic range content and high dynamic range content are simultaneously displayed. Tone mapping parameters may be produced by a tone mapping engine for use in displaying the standard and high dynamic range content. The tone mapping parameters may be selected based on factors such as ambient light level, user brightness setting, content statistics, and display characteristics. Tone mapping parameters may be selected to accommodate simultaneous display of standard and high dynamic range content and to accommodate transitions between standard and high dynamic range content.

21 Claims, 9 Drawing Sheets

(51) Int. Cl.
    *G06T 5/00*     (2006.01)
    *G06T 11/00*     (2006.01)
    *H05B 33/08*     (2006.01)
    *H04N 1/60*     (2006.01)
    *H04N 5/57*     (2006.01)
    *H04N 9/64*     (2006.01)

(56) References Cited

U.S. PATENT DOCUMENTS

| | | |
|---|---|---|
| 2013/0293121 A1 | 11/2013 | Viacheslav |
| 2014/0210847 A1* | 7/2014 | Knibbeler .............. G09G 5/006 |
| | | 345/589 |
| 2015/0245044 A1 | 8/2015 | Guo et al. |
| 2017/0034520 A1* | 2/2017 | Rosewarne ........ H04N 19/1887 |
| 2018/0220101 A1* | 8/2018 | Evans .................. H04N 7/0117 |

* cited by examiner

ELECTRONIC DEVICES WITH TONE MAPPING TO ACCOMMODATE SIMULTANEOUS DISPLAY OF STANDARD DYNAMIC RANGE AND HIGH DYNAMIC RANGE CONTENT

This application claims the benefit of provisional patent application No. 62/505,670, filed May 12, 2017, which is hereby incorporated by reference herein in its entirety.

BACKGROUND

This relates generally to electronic devices, and, more particularly, to electronic devices with displays.

Electronic devices often include displays. If care is not taken, displays may be damaged by displaying bright content for prolonged periods of time, displays may be operated with brightness levels that consume excessive power, user preferences may not be taken into account when adjusting display brightness, and displayed content may exhibit visible artifacts. Addressing these concerns while displaying content with a pleasing appearance is challenging.

SUMMARY

An electronic device may be provided with a display. Content generators on the electronic device may provide content to be displayed on the display. Control circuitry in the electronic device may be used in implementing a tone mapping engine. The tone mapping engine may select a content-luminance-to-display luminance mapping to be used in displaying content on the display from a content generator. A content-luminance-to-display-luminance mapping may be characterized by tone mapping parameters such as a black level, a reference white level, a specular white level, skin tone level, and the slope or the gamma of the mapping.

Standard and high dynamic range content may be produced by standard and high dynamic range content generators running on the control circuitry. In a first mode of operation, standard dynamic range content is displayed. In a second mode of operation, high dynamic range content is displayed. In a third mode of operation, standard dynamic range content and high dynamic range content are simultaneously displayed.

The tone mapping engine may select tone mappings (content-luminance-to-display-luminance mappings) and associated tone mapping parameters for use in displaying the standard and high dynamic range content. The tone mapping parameters may be selected based on factors such as ambient light level, user brightness setting, content statistics, and display characteristics. Tone mapping parameters may be selected and adjusted dynamically to accommodate simultaneous display of standard and high dynamic range content, to accommodate transitions between standard and high dynamic range content, and to accommodate operating environment changes such as adjustments to a user-selected brightness setting and ambient light level. Content statistics and display characteristics may also be used in adjusting the tone mapping parameters.

DETAILED DESCRIPTION

Figure 1:
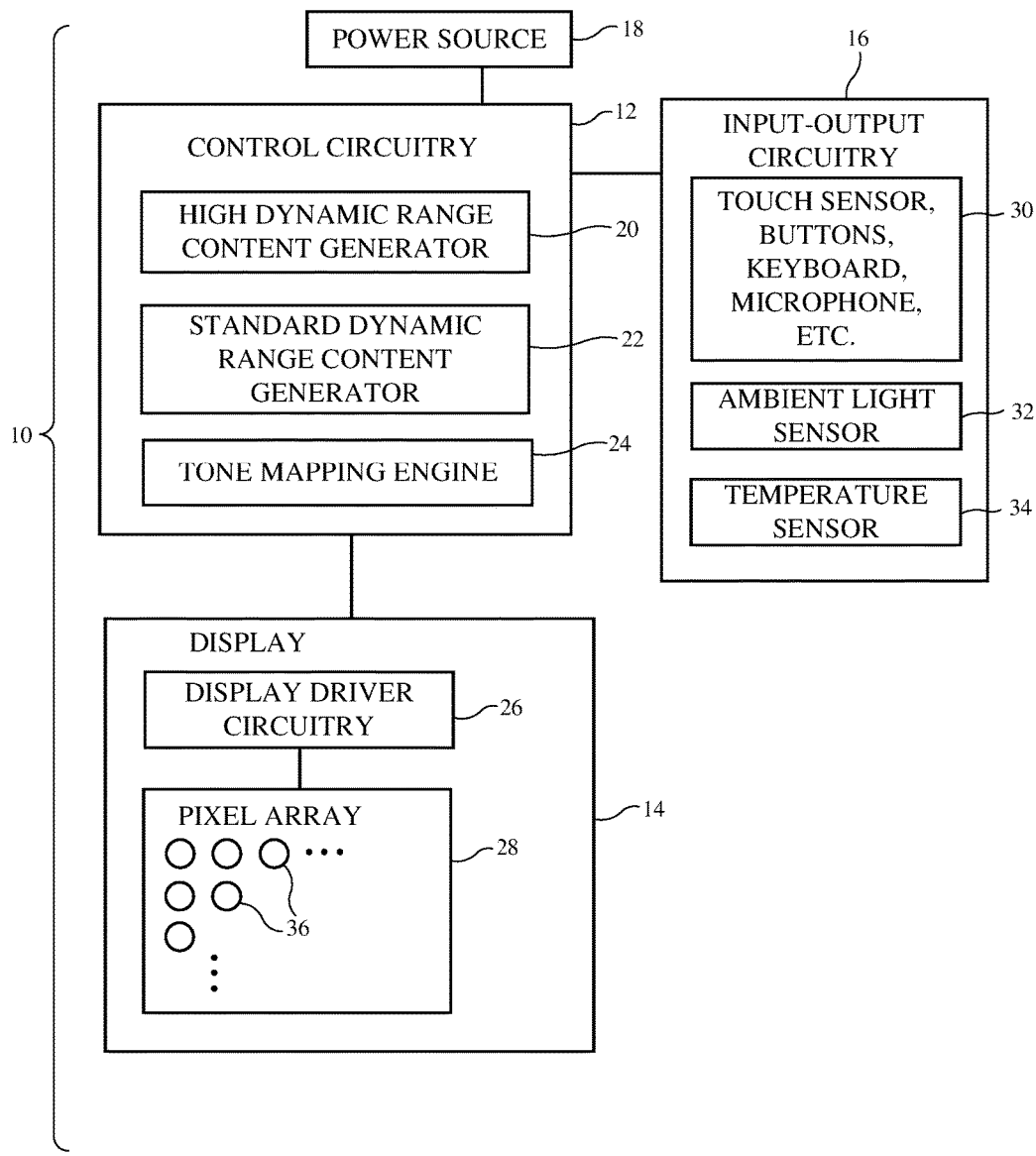
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on ambient light conditions, user-adjusted display brightness settings, statistical information associated with content that is being displayed, and display characteristics. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements). Input-output circuitry 16 may also include temperature sensor circuitry such as one or more temperature sensors. Temperature sensors such as temperature sensor 34 may be used to gather real time information on the operating temperature of device 10 and display(s) associated with device 10.

Power may be supplied to control circuitry 12 and other resources in device 10 using one or more power sources such as power source 18. Power source 18 may be an alternating-current (AC) source such as a wall outlet (mains supply) and/or a direct-current (DC) source such as a battery. During operation, control circuitry 12 can detect whether power is being received from an AC or DC source and can monitor the charge state of the battery.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 14 may be backlit with an array of locally dimmable light-emitting diodes or other suitable backlight structures. Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

During operation, content generators in device 10 (e.g., operating system functions and/or applications running on control circuitry 12) may generate content for display on the pixel array of display 14. As an example, electronic device 10 may include one or more standard dynamic range (SDR) content generators and/or more high dynamic range (HDR) content generators (e.g., content generators that generate high dynamic range content in accordance with one or more different high dynamic range standards such as the HDR10 Media Profile standard, sometimes referred to as HDR10 and the Hybrid Log-Gamma standard, sometimes referred to as HLG). A luminance value mapping engine such as tone mapping engine 24 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 24 may supply content generators with tone mapping parameters such as a black level, reference white level, specular white level, skin tone level, and/or gamma and/or slope values to use in producing display luminance values for use in displaying images with pixels 36. Tone mapping engine 24 may be implemented using code running on control circuitry 12 of FIG. 1, control circuitry for device 10 such as display driver circuitry 26, and/or other control circuitry and/or may use hardwired features of the control circuitry in device 10.

Standard dynamic range content is often encoded in grey levels (e.g., 0-255 bits), where 0 corresponds to dark black and 255 corresponds to bright white. High dynamic range content is encoded in luminance levels for each pixel (generally to be displayed for standard viewing conditions such as dim viewing conditions). Device 10 may experience changes in ambient lighting conditions, user brightness settings may be adjusted up and down by a user, the content being displayed on display 14 may exhibit changes such as changes in average pixel luminance, and burn-in risk, and other conditions related to the presentation of content on display 10 may change over time. Device 10 may use tone mapping engine 24 to ensure that content is rendered appropriately for displaying on display 14 in view of these potentially changing conditions and other criteria such as the characteristics of display 14.

Figure 2:
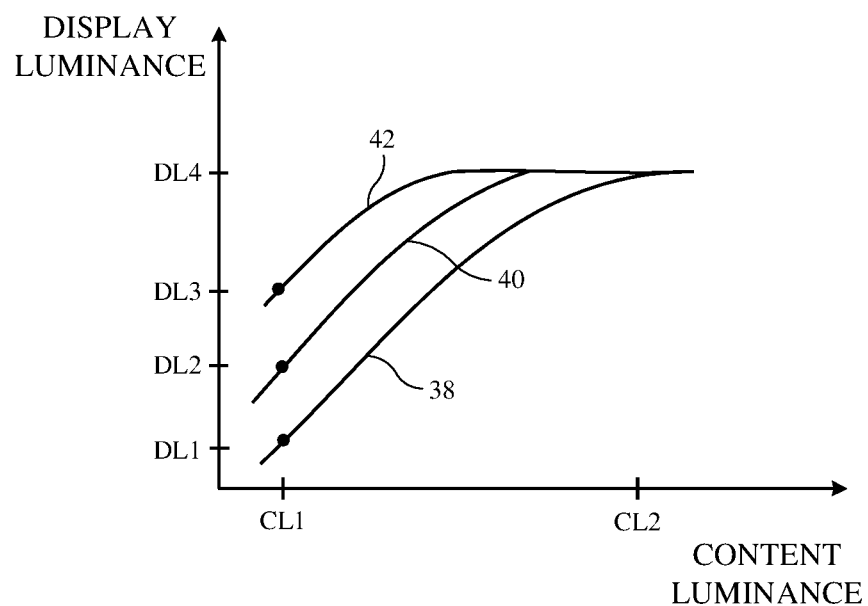
FIG. 2 is a graph showing how content luminance may be mapped to display luminance over a variety of user brightness settings in accordance with an embodiment.

FIG. 2 is a graph showing how content luminance values can be mapped to display luminance values in device 10 in accordance with three illustrative content-luminance-to-display-luminance mapping curves. The content luminance and display luminance axes of the graph of FIG. 2 (and the other luminance mapping graphs) have logarithmic scales. In the FIG. 2 example, a user is adjusting a display brightness setting for display 14 between three different levels (dim, moderate, and bright display brightness settings, respectively). A user may supply device 10 with a desired brightness setting (user-selected brightness level) by adjusting a touch screen display slider (e.g., a slider displayed on display 14) or using a button or other input-output device in circuitry 16. When a dim brightness setting level is selected, display 14 displays content in accordance with curve 38. When a moderate brightness setting level is selected, display 14 displays content in accordance with curve 40. The output of display 14 follows curve 42 in response to selection of a high brightness setting.

In each of these curves, low content luminance values are associated with black and high content luminance values are associated with white. At a given black content luminance level (e.g., BC1), curve 38 is associated with a display pixel luminance value of DL1 visible to the user for a content luminance value of CL1, curve 40 is associated with a display pixel luminance value of DL2 for content luminance CL1, and curve 42 is associated with a display pixel luminance value DL3 for content luminance CL1. The luminance level DL2 is brighter than luminance level DL1, because curve 40 is associated with a brighter set of output luminances from pixels 36 than curve 38. Similarly, luminance level DL3 is brighter than luminance level DL2 because curve 42 is associated with a brighter set of output luminances from pixels 36 than curve 40. White image pixels (e.g., pixels at content luminance level CL2) are all associated with the same display luminance level DL4 (e.g., the brightest output available from pixels 36 in display 14), so the mappings of curves 38, 40, and 42 will all produce a display luminance of DL4 for a content luminance of CL2.

Figure 3:
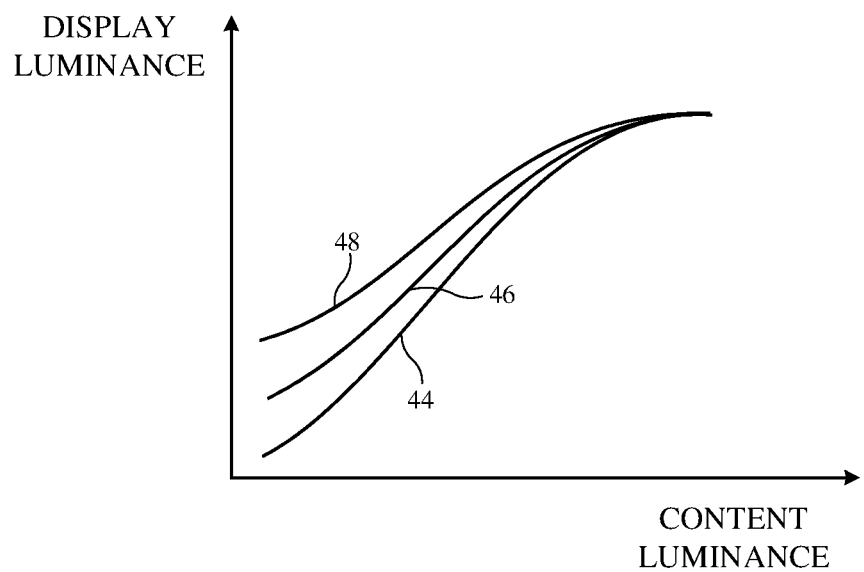
FIG. 3 is a graph showing how content luminance may be mapped to display luminance over a variety of ambient light conditions in accordance with an embodiment.

FIG. 3 is a graph showing how content luminance values can be mapped to display luminance values by device 10 in three different illustrative ambient light conditions. In the example of FIG. 3, curve 44 is associated with dim ambient light conditions (e.g., conditions corresponding to a dark indoors environment), curve 46 is associated with moderate ambient lighting conditions (e.g., a bright office or dim outdoors environment), and curve 48 is associated with bright ambient lighting conditions (e.g., a bright outdoors environment). Although similar to the curves of FIG. 2, the curves of FIG. 3 may be optimized for changes in ambient lighting conditions rather than user brightness settings. For example, whereas in dim lighting conditions curves 44 and 38 may be similar, ambient light glare may be present on display 14 under bright lighting conditions that tends to obscure black portions of the images on display 14. As a result, the curves of FIG. 3 (see, e.g., bright ambient light curve 48) may have somewhat elevated display luminance values at low content luminances to help overcome the ambient light glare, whereas this elevation in the output luminance for black content may not be present in scenarios in which a user has increased display brightness by selecting a curve such as curve 42 of FIG. 2.

In general, display characterization may involve user studies, modeling, and laboratory testing that helps establish desired tone mapping schemes for device 10 under a variety of operating conditions (e.g., user brightness settings, ambient light levels, and other operating conditions). These tone mapping schemes can then be implemented by tone mapping engine 24.

With one illustrative configuration, tone mapping engine 24 can select a desired tone mapping curve based on operating conditions such as display brightness settings (e.g., user defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), and display characteristics (e.g., display limitations such as maximum achievable pixel luminance, power constraints (e.g., due to thermal limitations and/or other considerations), whether device 10 is operating on DC power (power from the battery in source 18 of device 10) or AC power, etc.

During operation, tone mapping engine 24 may obtain information on these operating conditions and may take suitable action to ensure that display 14 displays images satisfactorily. Tone mapping engine 24 may, as an example, remap content so that luminance values that are too high when output from a content generator are reduced by engine 24 before these values are used by display 14. In some situations, luminance values associated with specular highlights may, as an example, be clipped using a soft clipping arrangement to ensure that pixels 36 are not driven too strongly for display 14. Tone mapping engine 24 may also provide content generators such as content generators 20 and/or 22 with tone mapping parameters that inform the content generators of a desired content-luminance-to-display-luminance mapping curve to be used in displaying images on display 14.

Figure 4:
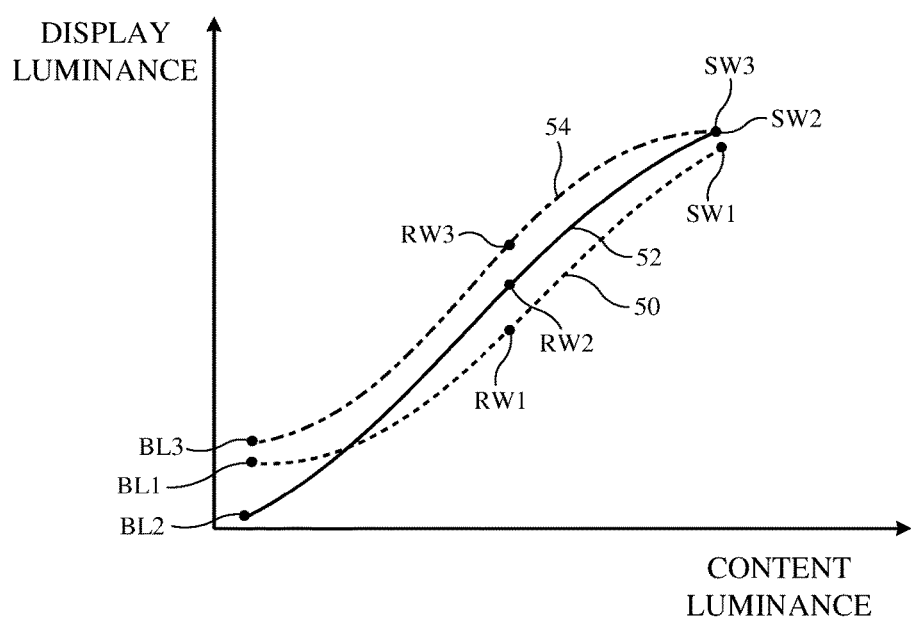
FIG. 4 is a graph showing how content-luminance-to-display-luminance relationships may be characterized by a black level, reference white level, and specular white level in accordance with an embodiment.

The use of tone mapping parameters to define content-luminance-to-display-luminance mapping curves is shown in FIG. 4. In the example of FIG. 4, there are three illustrative mapping curves: curve 50, 52, and 54. Each of these curves may be identified using a set of tone mapping parameters such as a black (BL), reference white level (RW), and specular white level (SW). During operation, engine 24 may supply content generators such as content generators 20 and/or 22 with suitable values of these tone mapping parameters, thereby informing content generators 20 and/or 22 whether to use curve 50, curve 52, or curve 54. If, for example, engine 24 supplies a content generator with tone mapping parameters BL1, RW1, and SW1, the content generator can generate display luminance values from content luminance values following curve 50. If, engine 24 supplies the content generator with tone mapping parameters BL2, RW2, and SW2, the content generator can generate display luminance values from content luminance values following curve 52. The content generator can generate display luminance values from content luminance values following curve 54 in response to tone mapping parameters BL3, RW3, and SW3 from engine 24. In this way, a set of tone mapping parameters (e.g., three or more tone-mapping parameters, 3-10 tone-mapping parameters, fewer than 5 tone-mapping parameters, etc.) can be used by engine 24 to specify a desired tone mapping relationship for the content generator to follow depending on current operating conditions. If a skin tone mapping parameter is used, its value may, as an example, lie between the reference white level and specular white level or between the reference white level and the black level and may represent skin tones common to human skin. Gamma and/or curve slope values may also be used as tone mapping parameters that specify a content-luminance-to-output-luminance mapping curve.

Figure 5:
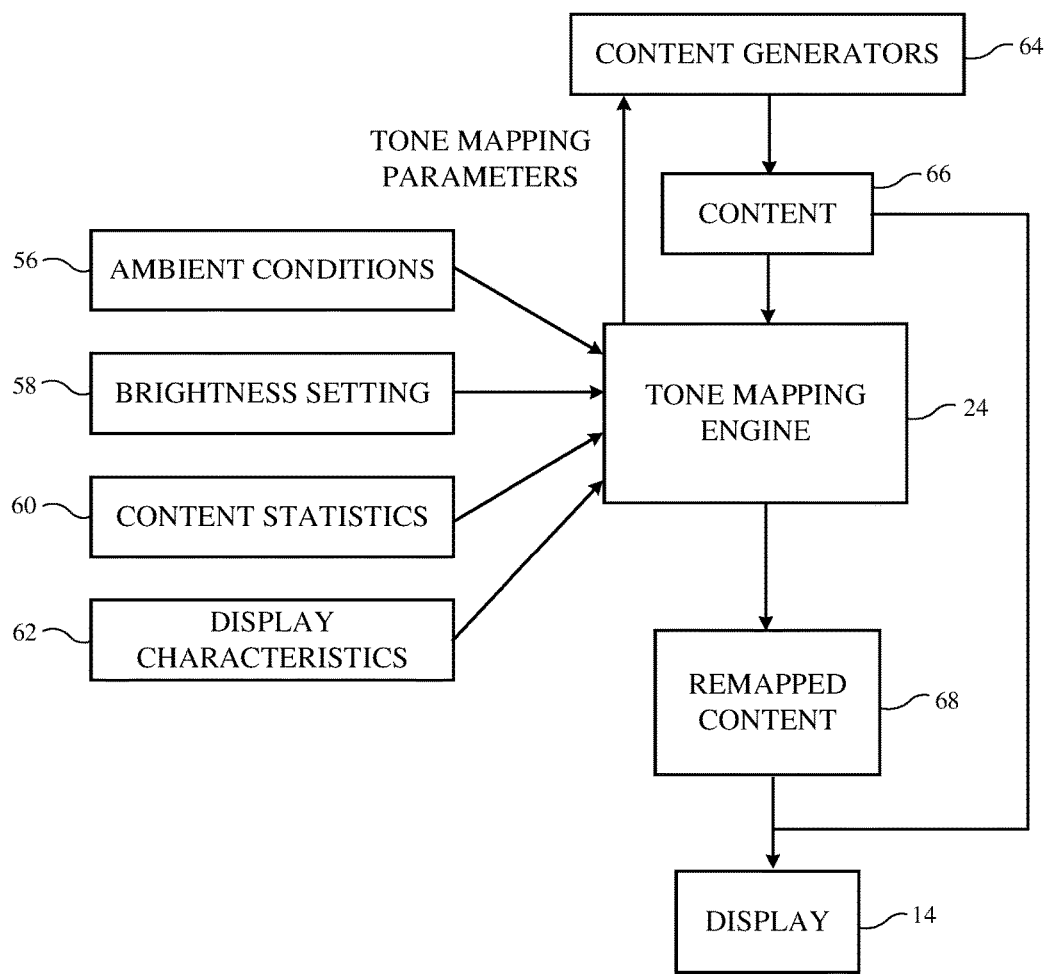
FIG. 5 is a diagram showing how a tone mapping engine can be used in implementing content-luminance-to-display-luminance mappings in accordance with an embodiment.

FIG. 5 is a diagram showing how tone mapping engine 24 may receive input such as ambient conditions 56, brightness settings information 58, content statistics 60, and display characteristics 62.

Ambient conditions 56 may include a current ambient light level measured with ambient light sensor 32 and/or a current ambient color (e.g., a color temperature, set of color coordinates, etc.) measured with ambient light sensor 32. As environmental brightness increases, display brightness can be increased to compensate for screen glare. As environmental color shifts (e.g., as a user moves device 10 from a warm indoor lighting environment to a cold outdoor lighting environment), the white point (color cast) of display 14 can be cooled accordingly to avoid undesired color cast effects in displayed images.

Brightness settings information 58 may include a user-selected brightness level and may include a brightness level determined by control circuitry 12 based on power consumption considerations. User brightness settings may be adjusted based on user input from a user on a touch screen, based on user keyboard input, and/or based on other user input. Power-consumption-based brightness level adjustments may be made by control circuitry 12 to help extend battery life. For example, control circuitry 12 may lower the brightness level for display 14 when device 10 enters a low power mode due to thermal conditions such as in response to detection that a temperature level measured with sensor 34 has exceeded a predetermined level, due to detection of a low battery level measured with control circuitry 12, based on detection that a user has placed device 10 in a low power mode to extend battery life, etc. In low power mode, control circuitry 12 may lower the current display brightness setting, may impose a cap on the brightness level, and/or may reduce the luminance of specular highlights or may make other adjustments that help reduce the power consumption of display.

Content statistics 60 may be gathered by analyzing frames of image data produced by content generator(s) 64 that are being displayed on display 14 or may be provided in the form of metadata (e.g., content category information such as, for example, "movie" or "live sports"). Control circuitry 14 (e.g., a microprocessor, display driver integrated circuits, graphics processing unit circuitry, and/or other control circuitry in device 10) may, for example, maintain running averages of image luminance values (e.g., a running average pixel luminance value for images being displayed on display 14 over multiple image frames) and/or may maintain historical luminance information in a more granular fashion (e.g., on blocks of one or more pixels within pixel array 28) to quantify burn-in risk for each of these blocks. Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to tone mapping engine 24.

Display characteristics 62 may also be used by tone mapping engine 24. Display characteristics 62 may include information on physical display limitations for display 14. For example, display characteristics 62 may include information on the characteristics of pixel array 28 and display 14 (e.g., maximum achievable specular white level, display resolution, contrast ratio, bit depth, etc.). These display characteristics may be stored in control circuitry 12 during manufacturing (e.g., when display 14 is built into device 10) and/or may be obtained from display 14 when display 14 is coupled to device 10 (e.g., when display 14 is a stand-alone display). A user may also supply control circuitry 12 with display characteristics information (e.g., by entering this information using a keyboard or other input-output device). In some configurations, display characteristics may be set by default and/or retrieved from a database of display characteristics maintained in device 10 (e.g., a database of stand-alone display models).

During operation, content generators 64 may produce content to be displayed on display 14. Content generators 64 may, for example, render game images in a video game, may retrieve stored movie data and provide corresponding video frames to be displayed on display 14, may produce still image frames associated with an operating system function or application program, and/or may produce other content for displaying on display 14. The content from content generators 64 may include standard dynamic range content and/or high dynamic range content.

Tone mapping engine 24 may use information on ambient conditions 56, brightness settings information 58, content statistics 60, and/or display characteristics 62 to determine how original content values should be mapped to display content values (e.g., to determine how to map content luminance values to display luminance values in accordance with mapping curves of the type described in connection with FIG. 4). To ensure that content is displayed appropriately on display 14, tone mapping engine 24 can provide content generators 64 with tone mapping parameters to use in performing luminance mapping operations and/or can implement luminance mapping for content generators 64.

In some configurations, content generators 64 may be capable of adjusting content luminance values internally. In these situations, tone mapping engine 24 can supply content generators 64 with tone mapping parameters such as a black level, reference white level, specular white level, skin tone level, and the slope or gamma of the mapping curve. The tone mapping parameters inform content generators 64 of an appropriate mapping curve to use in supplying content 66 to display 14.

In other configurations, content generators 64 may not be capable of adjusting content luminance values internally or it may otherwise be desirable to implement tone mapping separately from the tone mapping functions of content generators 64. In these circumstances, content 66 from content generator 64 may be provided to tone-mapping engine 24. Tone mapping engine 24 may then apply a desired content-luminance-to-display luminance mapping (e.g., a mapping defined by the tone mapping parameters BL, RW, and SW) to ensure that the luminance of content 66 is adjusted appropriately (e.g., so that content 66 is remapped in accordance with a desired content-luminance-to-display luminance mapping to produce corresponding remapped content 68 for displaying on display 14). In mapping the luminance values of content 66 to the new (remapped) luminance values of content 68, the content-luminance-to-display luminance mapping that is used by engine 24 may follow pre-defined parameters (e.g., default) tone mapping parameters or may use the same tone mapping parameters that engine 24 would provide to a content generator that is capable of adjusting content luminance values by applying the desired mapping internally.

In some situations, only standard dynamic range content from standard dynamic range content generator 22 is displayed on display 14. Standard dynamic range content generator 22 may be associated with displaying standard video and images, on-screen menus, pop-up boxes, selectable on-screen buttons, text documents, standard dynamic range graphics, and other standard dynamic range content. In these situations, a tone mapping may be selected so that the standard dynamic range content is displayed satisfactorily on display 14. As an example, the standard dynamic range content may be displayed with a maximum luminance (SW level) that is lower than the maximum possible pixel luminance supported by the hardware of display 14. This approach may help conserve power while displaying the content for a user.

In other situations, only high dynamic range content from high dynamic range content generator 20 is displayed on display 14. The high dynamic range content supplied by high dynamic range content generator 20 has a higher dynamic range than the standard dynamic range content from standard dynamic range content generator 22. To take advantage of the larger dynamic range associated with the content from content generator 20 (e.g., to ensure that specular highlights are sufficiently bright for a viewer), a tone mapping may be selected that allows the brightest pixels in the high dynamic range content to be displayed with elevated luminance levels relative to the brightest pixels in the standard dynamic range content.

It is sometimes desirable to display content that has one or more areas of standard dynamic range content and one or more areas of high dynamic range content. For example, standard dynamic range picture-in-picture content may be displayed on high dynamic range background content using a picture-in-picture arrangement. The background content may, for example, extend across all of display 14. The picture-in-picture content may partly cover the background content. As an example, the picture-in-picture content may be displayed in a rectangular area that overlaps some of the background area while allowing other portions of the background area to be viewed by a user.

A background area and a picture-in-picture area may contain different types of content (e.g., one area may have standard dynamic range content and another area may have high dynamic range content). As an example, a high dynamic range video may be displayed in the background area and picture-in-picture window standard dynamic range content (still images, video, and/or text and graphics) may overlap a portion of the background area. In another illustrative arrangement, a split-view window approach may be used in which high dynamic range content on one side of display 14 (e.g., the left side) is simultaneously displayed with standard dynamic range content on another side of display 14 (e.g., the right side). Slide-over content arrangements in which an area of standard dynamic range content slides over and progressively covers increasing portions of a high dynamic range area on display 14 or in which high dynamic range content slides over standard dynamic range content on display 14 may also be used. In some arrangements, standard dynamic range text such as text for editing buttons, subtitles, and closed captioning information may be overlaid on high dynamic range content.

When standard dynamic range and high dynamic range areas are displayed simultaneously, the black level, reference white level, and specular white level can for each of these areas can be independently adjusted to ensure that the content on display 14 is presented satisfactorily (e.g., to avoid situations in which some of the content appears washed out or too bright compared to other content, to avoid situations in which white standard definition text appears grayish rather than white when adjacent to content with bright specular highlights, etc.). For example, tone mapping engine 24 can detect when mixed standard dynamic range and high dynamic range is being presented (or is about to be presented) on display 14 and can generate corresponding standard dynamic range and high dynamic range tone mapping parameters that balance the appearances of the standard dynamic range and high dynamic range areas to avoid undesired visual effects while taking into account factors such as ambient light conditions, content statistics, user brightness settings, and display characteristics. Transitions between standard dynamic range and high dynamic range content can be performed smoothly by dynamically adjusting tone mapping parameter values while transitioning. For example, if high dynamic range content with a high specular white level is being replaced by standard dynamic range content with a low specular white level, the specular white level can be transitioned between the high and low levels over a suitable transition period (e.g., 0.5-20 s, 0.5-50 s, 0-50 s, 1-100 s, more than 3 s, less than 20 s, or other suitable transition period) to avoid an overly abrupt transition. When operating conditions change (e.g., an ambient light level changes), the sets of respective tone mapping parameters associated with standard dynamic range area(s) on display 14 and high dynamic range area(s) can be adjusted accordingly.

Figure 6:
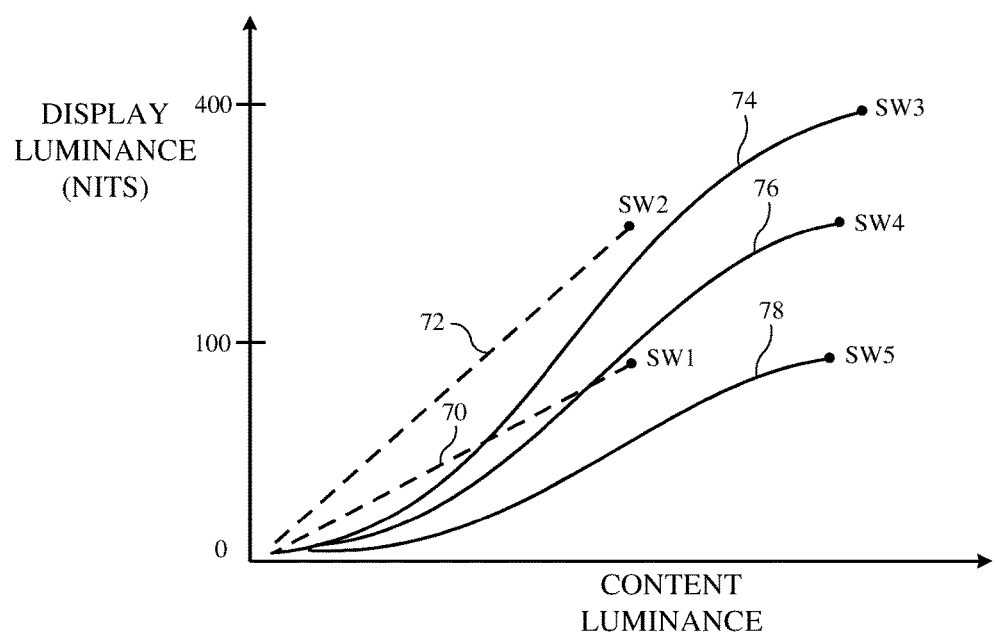
FIG. 6 is a graph showing how tone mapping parameters for areas of a display containing standard dynamic range content and high dynamic range content in accordance with an embodiment.

FIG. 6 is a graph showing how content-luminance-to-display-luminance mappings may be adjusted dynamically by tone mapping engine 24 to accommodate transitions between standard dynamic range and high dynamic range content and/or to handle the simultaneous display of content with standard dynamic range and high dynamic range areas.

Consider, as an example, a scenario in which standard dynamic range content is displayed on display 14 in the absence of high dynamic range content. In this scenario, it may be desirable to use a mapping curve such as curve 70 in displaying the standard dynamic range content. This mapping will display content in a manner that appears normal and acceptable to a user for standard dynamic range content and that matches artistic intent. The content may be, for example, text and graphics associated with an operating system or application function such as a web browser, email application, file browser, word processor, messaging feature, or other standard dynamic range content generator 22. By avoiding excessive specular white levels (e.g., by limiting the specular white level for curve 70 to a specular white level SW1 of 100 nits in the example of FIG. 6), excessive power consumption and other undesired behaviors (e.g., elevated burn-in risk, reduced display lifetime, etc.) can be avoided.

When high dynamic range content is present and no standard dynamic range content is present, it may be desirable to use a mapping curve such as curve 74 to present the high dynamic range content. Curve 74 is characterized by a high specular white level SW3 (e.g., 400 nits in this example). To conserve power and to avoid undesired behaviors such as elevated burn-in risk, reduced display lifetime, etc. while displaying high dynamic range content, curve 76 may be used in place of curve 74 or curve 78 may be used in place of curve 74. Curve 76 has a specular white level SW4 that is lower than SW3 so that content is displayed less brightly and power is conserved. Curve 78 has a specular white level SW5 that is lower than SW4 so that content is displayed less brightly and more power is conserved than when using curve 76.

When transitioning between a configuration in which standard dynamic range content is being displayed and a configuration in which high dynamic range content is being displayed, tone mapping parameters can be changed gradually to prevent undesired visual artifacts (e.g., undesired jumps in image brightness). For example, when transitioning from high dynamic range content to standard dynamic range content, curve 74 may be gradually transitioned to curve 78 while the high dynamic range content is displayed so that when curve 70 is used to display standard dynamic range content there is not an abrupt change in image brightness.

If high dynamic range content is being displayed simultaneously with standard dynamic range content, it may be desirable to use a mapping curve such as curve 72 to display the standard dynamic range content. Curve 72 is characterized by an elevated specular white level SW2 (e.g., SW2 is greater than SW1 and may, for example, have a value of 200 nits, 200-400 nits, 400 nits, less than 400 nits, more than 250 nits, etc.), which may help make bright portions of the standard dynamic range content appear less grayish when presented adjacent to the high dynamic range content with bright white regions. In addition to increasing specular white level SW1 to SW2 for the standard dynamic range content, specular white level SW3 of curve 74 (which is used for the high dynamic range content) can be reduced to SW4 (e.g., a SW4 value equal or nearly equal to SW2) for high dynamic range content. Configurations in which standard dynamic range content is displayed using specular white level SW1 while high dynamic range content is displayed using curve 78 and specular white level SW5 (e.g., a specular white level equal or nearly equal to specular white level SW1 and different from SW2) may also be used.

In general, when both standard dynamic range content and high dynamic range content are displayed simultaneously on display 14, the mapping curve used for presenting the standard dynamic range content and/or the mapping curve used for presenting the high dynamic range content may be adjusted to present the content in a visually appealing fashion while taking into account current operating conditions such as ambient light level, user brightness setting, content statistics, and display characteristics. The simultaneous presentation of both standard dynamic range content and high dynamic range content may, for example, be accommodated by shifting curve 70 upwards, may be accommodated by shifting curve 74 downwards, may be accommodated by both shifting curve 70 upwards and curve 74 downwards, etc. Transition periods (e.g., periods of 0.5-20 s, 0.5-50 s, 1-15 s, more than 2 s, less than 20 s, or other suitable time periods) may be used in dynamically shifting the content-luminance-to-display-luminance curves for the standard dynamic range content and high dynamic range content to ensure that visual changes are made smoothly and abrupt adjustments to image brightness are avoided.

Figure 7:
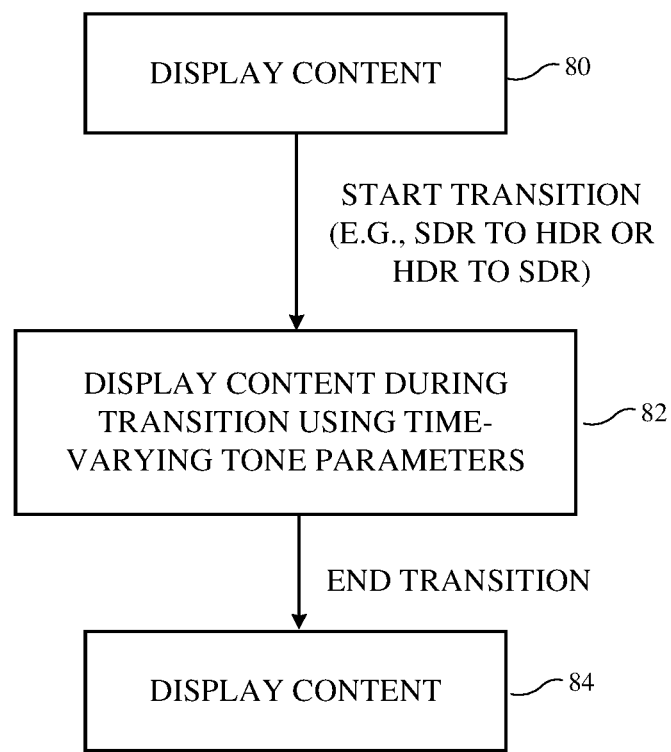
FIG. 7 is a flow chart of illustrative operations associated with transitioning between standard dynamic range content and high dynamic range content in accordance with an embodiment.

FIG. 7 is a flow chart of illustrative operations involved in transitioning between standard dynamic range content and high dynamic range content (e.g. switching between first content that has a first dynamic range and first content-luminance-to-display-luminance mapping and second content that has a different second dynamic range and second content-luminance-to-display-luminance mapping that is different than the first content-luminance-to-display-luminance mapping).

During the operations of block 80, a content generator (e.g., high dynamic range content generator 20 or standard dynamic range content generator 22) may generate content to be displayed on display 14. For example, the content generator of block 80 may be a video playback application that is playing HDR content such as an HDR movie or may be an email application that is displaying SDR content such as a list of email messages. When the playback of the video or the user's viewing of the email message list is complete, the user may desire to switch to a different type of content. For example, the user may wish to view SDR content after the HDR content or may wish to transition from HDR content to SDR content. The user may supply device 10 with an input command and/or device 10 may automatically initiate a transition from HDR to SDR content or from SDR to HDR content.

In response to detection of the start of this transition, the tone mapping that is being used for displaying the current content may be transitioned (over a suitable transition time period) to a new tone mapping (e.g., a tone mapping appropriate for the new content). As an example, an HDR tone mapping (e.g., curve 74) may, during the operations of block 82, be smoothly transitioned to lower specular white levels such as SW5 to better match an SDR tone mapping (e.g., curve 70) and/or an SDR tone mapping may be smoothly transitioned towards an HDR tone mapping. To transition HDR to SDR, for example, tone mapping engine 24 may smoothly lower a specular white level from an HDR specular white level to an SDR specular white level (and/or may likewise transition reference white and/or black levels from HDR levels to SDR levels). To transition SDR to HDR, tone mapping engine may smoothly raise a specular white level from an SDR specular white level to an HDR specular white level (and/or may likewise dynamically adjust reference white and/or black levels from SDR levels to HDR levels).

Following the smooth transition over a suitable time period, the new content may be displayed on display 14 (block 84).

Figure 8:
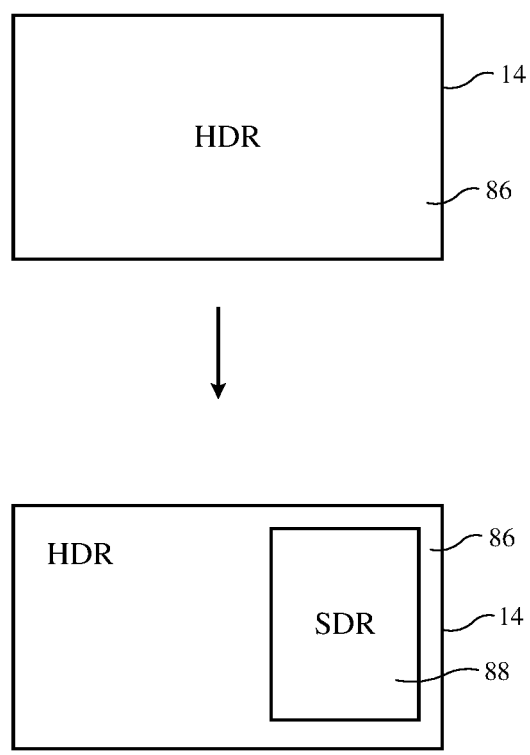
FIG. 8 is a diagram illustrating how an electronic device may display content that includes both standard dynamic range and high dynamic range areas in accordance with an embodiment.

FIG. 8 illustrates how device 10 may sometimes transition from displaying one type of content (e.g., SDR or HDR) to both types of content (e.g., SDR and HDR in respective portions of display 14). In the example of FIG. 8, display 14 is initially displaying HDR content 86, as shown in the upper portion of FIG. 8. When it is desired to display SDR content (e.g., in a pop-up window, as a split screen, as captions or other text, as icons or other button labels, etc.) device 10 may transition to an arrangement of the type shown in the lower portion of FIG. 8. In this type of arrangement, SDR content 88 overlaps HDR content 86 so that both SDR and HDR content are being displayed in respective areas of display 14.

Figure 9:
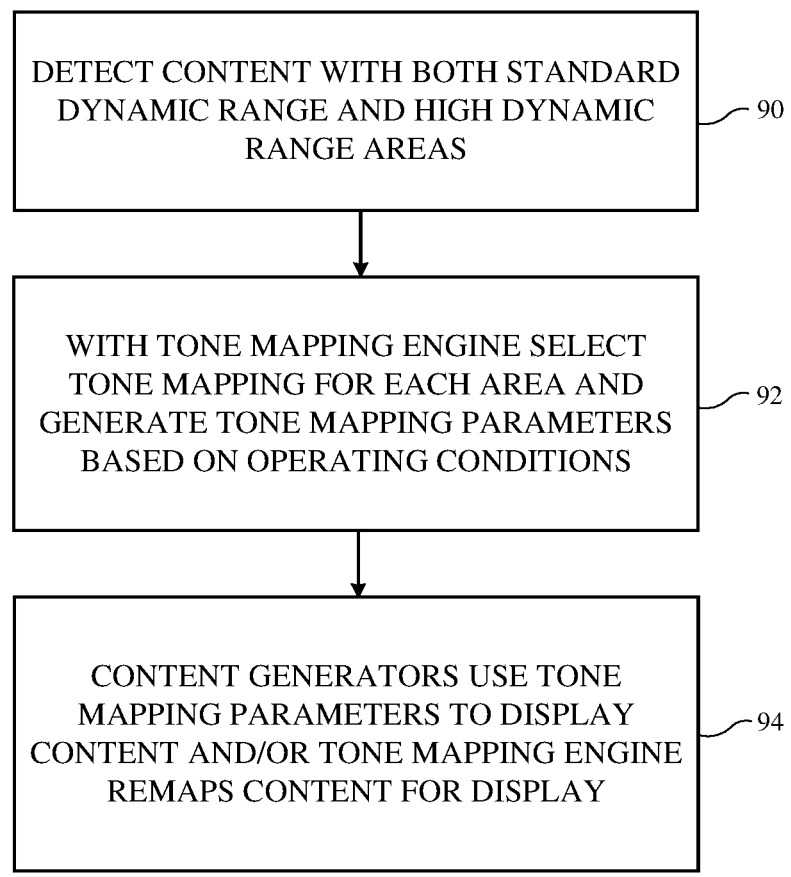
FIG. 9 is a flow chart illustrating how an electronic device may display standard and high dynamic range content in accordance with an embodiment.

FIG. 9 is a flow chart of illustrative operations involved in handling transitions of the type shown in FIG. 8. Initially, content may be displayed with only one type of mapping curve (e.g., SDR content may be displayed with an SDR-appropriate mapping curve or HDR content may be displayed with an HDR-appropriate mapping curve). During the operations of block 90, control circuitry 12 may determine whether both HDR and SDR content should be displayed (e.g., in response to user input, an automatic operation that pops up an overlay window or split-screen, etc.) and may generate information indicating that HDR and SDR content are to be displayed on display 14.

In response to detecting the presence of content for display 14 that includes both one or more areas of SDR content and one or more HDR content areas, tone mapping engine 24 may, during the operations of block 92, select appropriate mapping curves for the respective SDR and HDR areas. If the HDR areas include HDR content that is compliant with different HDR standards, different sets of mapping curves may be used for the different HDR areas. For example, a first HDR area may be used to display HDR content compliant with a first HDR standard using a first HDR mapping curve defined by first tone mapping parameters and a second HDR area may be used to display HDR content compliant with a second HDR standard using a second mapping curve defined by second tone mapping parameters that are different than the first tone mapping parameters. The mapping curves that are selected may be selected based on ambient conditions 56 (e.g., brighter mappings of darker pixel levels may be desired to overcome glare in the SDR region and/or the HDR region), may be selected based on brightness settings 58 (e.g., a user-selected brightness setting or a low power mode brightness setting that has been manually invoked or invoked by control circuitry 12 in response to a display temperature measurement, battery charge level, etc.), may be based on content statistics 60 (e.g., information on content average pixel luminance information such as information indicating that a series of frames of content contain bright pixels and/or burn-in risk information such as burn-in risk metrics computed by averaging pixel luminances over multiple frames in each of a plurality of subareas of display 14, and/or other content statistics), and/or may be based on display characteristics 62 (e.g., information on the bit depth of display 14, etc.).

The selection of the respective SDR and HDR mapping curves may also be coordinated during the operations of block 92 so that the SDR and HDR content (e.g., HDR content of one or more types) are visually appealing when displayed together. This may involve compromises such as presenting HDR content using a lower specular white level than would normally be used for displaying HDR content in the absence of SDR content and presenting SDR content using higher specular white levels than would normally be used for displaying SDR content in the absence of HDR content. When appropriate tone mapping curves have been selected, associated tone mapping parameters (e.g., a first set of tone mapping parameters for SDR content and a second set of tone mapping parameters for HDR content) may be generated and provided to content generators 20 and 22.

During the operations of block 94, content generators 20 and 22 use the respective sets of HDR and SDR tone mapping parameters that were selected during the operations of block 92 in producing content for display 14 and/or tone mapping engine 24 can enforce desired mapping policies on content produced by content generators 20 and 22 (e.g., by remapping this content in accordance with the selected tone mapping curves) to ensure that the SDR and HDR areas of display 14 are displayed satisfactorily at the same time on display 14.

Device 10 may include one or more standard dynamic range content generators 22 and one or more high dynamic range content generators 20. Some of these content generators may accept the tone mapping parameters (BL, RW, and SW, etc.) that are generated by tone mapping engine 24 and may use the accepted tone mapping parameters to ensure that the output produced by those content generators complies with a desired tone mapping curve. Other content generators may not be capable of accepting the tone mapping parameters and/or may not comply with the tone mapping curves defined by the tone mapping parameters. These non-compliant content generators may, for example, produce content with luminance values that are greater than specified by the specular white level provided form tone mapping engine 24 (e.g., headroom, which is given by SW/RW may be restricted by tone mapping engine 24, but this headroom restriction may not be obeyed by a non-compliant content generator). To avoid burn-in, excess power consumption, clipping, and other issues, tone mapping engine 24 can remap the luminance values of the output of the non-compliant content generators (e.g., content generators that do not respect headroom restrictions) so that the resulting display luminance values from the tone mapping engine are fully compliant with the desired tone mapping curves. The tone mapping used by tone mapping engine 24 may implement soft clipping for peak luminance values and black values. This tone mapping may be applied locally (e.g., in subregions of display 14 such as areas that are not compliant with specified headroom restrictions) or globally for all of the content covering display 14.

Figure 10:
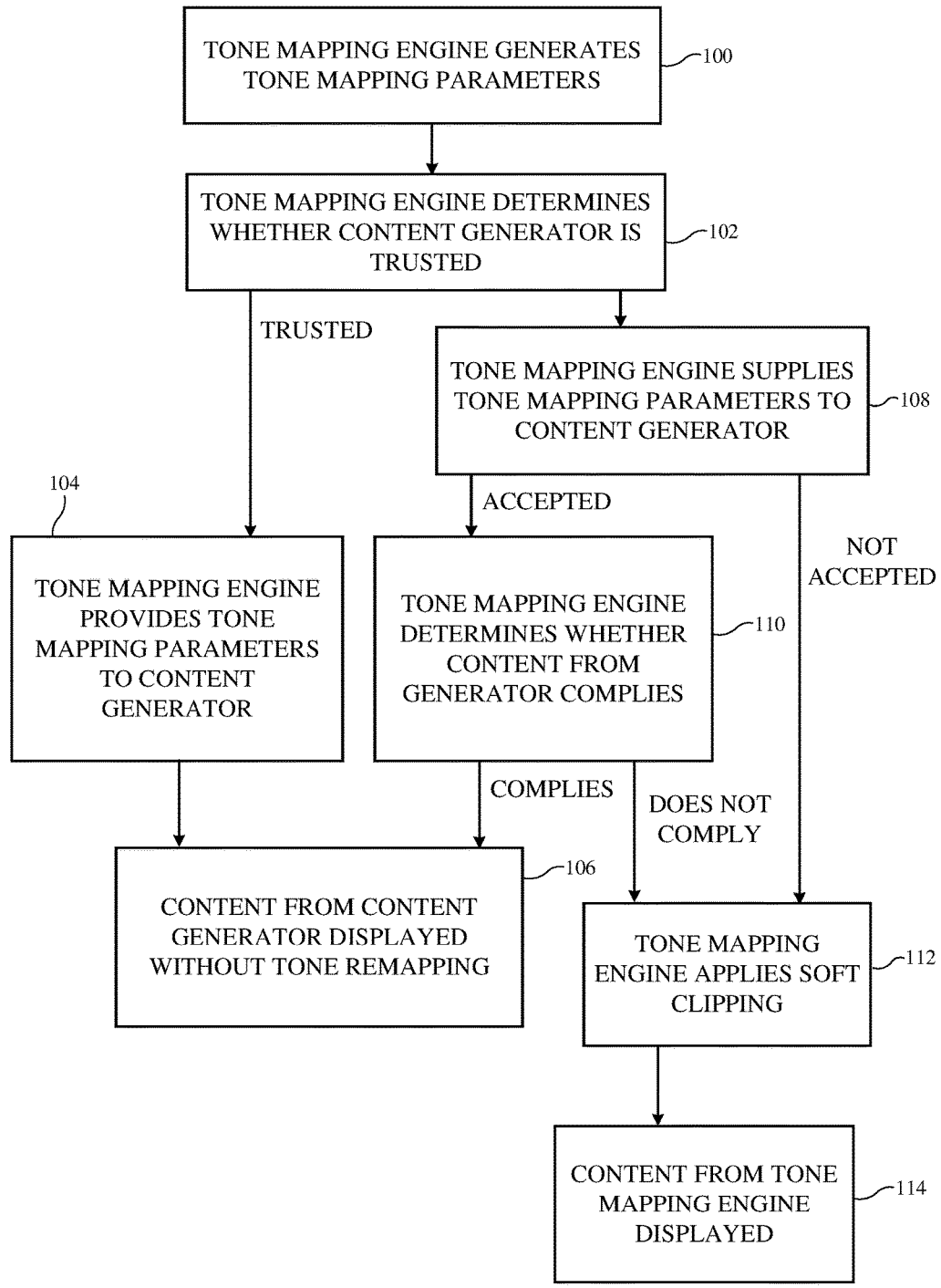
FIG. 10 is a flow chart illustrating how a tone mapping engine may be used in enforcing tone mapping policies for an electronic device in accordance with an embodiment.

FIG. 10 shows illustrative operations that are involved in operating device 10 in a scenario in which device 10 supports multiple content generators.

During the operation of block 100, tone mapping engine 24 may generate tone mapping parameters for the content that is to be displayed on display 14. The tone mapping parameters may include a single set of parameters suitable for displaying SDR or HDR content on display 14 or may include a set of SDR tone mapping parameters and a set of HDR tone mapping parameters to be used, respectively, for displaying content in respective SDR and HDR areas on display 14. In some configurations, the tone mapping parameters may include a SDR tone mapping parameters and multiple sets of HDR tone mapping parameters corresponding to HDR content using different HRD standards.

During the operations of block 102, tone mapping engine 24 may determine whether each of the content generators that is to supply display 14 with content is trusted or is not trusted. Trusted content generators may be listed in a database of trusted content generators that is maintained by control circuitry 12, may be considered to be trusted after authenticating to device 10 using suitable authentication protocols, may be trusted after complying with handshaking operations or other operations performed by control circuitry 12 during a content generator registration process, or may otherwise be determined to be content generators that will comply fully with the tone mapping parameters supplied by engine 24. Content generators that are not determined to be trusted during the operations of block 102 may be considered to be untrusted content generators.

If a given content generator is trusted, tone mapping engine 24 may provide the tone mapping parameters that are to be used by that content generator to that content generator during the operations of block 104. Content that is generated by the trusted content generator will comply with the mapping defined by the tone mapping parameters and will therefore be displayed appropriately on display 14 during the operations of block 106 without further involvement tone mapping engine 24 (e.g., tone mapping engine 24 will need not remap the output of the trusted content generator, because the output is known to be compliant with the tone mapping parameters provided by the tone mapping engine).

If a given content generator is determined to not be trusted during the operating of block 102, tone mapping engine 24 may attempt to supply the untrusted content generator with tone mapping parameters during the operations of block 108. If the tone mapping parameters are successfully received by the content generator, tone mapping engine 24 may, during the operations of block 110, determine whether content from the content generator is, in fact, complying with the tone mapping parameters (e.g., whether any of the content is potentially exceeding the luminance values specified in the content-luminance-to-display-luminance mapping associated with the tone mapping parameters and thereby disobeying headroom restrictions). If, during the operations of block 110, it is determined that the content generator is producing content that is compliant with the tone mapping parameters and associated mapping curve, the content may be displayed without further involvement of the tone mapping engine (block 106). In response to determining during the operations of block 110 that the content generator is producing content that is not compliant with the tone mapping parameters (e.g., if excessive luminance values that violate headroom restrictions are being output from the content generator) or if the tone mapping parameters from the tone mapping engine were not accepted by the content generator during the operations of block 108, tone mapping engine 24 may perform luminance value remapping operations during the operations of block 112.

During the operations of block 112, tone mapping engine 24 may receive the output (e.g., non-compliant output) from the content generator and may map the output luminance values from the content generator to display luminance values using the content-luminance-to-display-luminance mapping selected during the operations of block 110 (e.g., so that the content is remapped in accordance with the selected mapping curve and the associated tone mapping parameters for that curve). The remapped content may be displayed on display 14 during the operations of block 114. In this way, tone mapping engine 24 may implement functions such as soft clipping functions in which excessively bright luminance values are remapped to satisfactory lower luminance values to protect display 14, black content is remapped to and other avoid other issues that might arise with attempting to display non-compliant content. With one illustrative arrangement, tone mapping engine 24 may implement soft clipping using equation (1), where the output of the content generator is represented in the YCoCg color space (e.g., after performing a linear transform to change RGB values to YCoCg values), Y is the output luminance of the content generator, Y' is the corresponding remapped luminance from tone mapping engine 24, and parameters c1, c2, c3, and c4 are selected by tone mapping engine 24 based on tone mapping parameters BL, RW, and SW.

$$Y'=(c1*Y+c2)/(c3*Y+c4) \qquad (1)$$

Following soft clipping, values in YCoCg may be transformed to RGB color space, if desired. Other color spaces may be used in representing content and/or functions other than the function of equation 1 may be used in implementing soft clipping. Tone mapping engine 24 may enforce desired tone mapping policies in situations in which a content generator is not trusted and/or is otherwise not compliant with the tone mapping policies when only one type of content is being displayed on display 14 (e.g., only SDR content or only HDR content) and/or when multiple types of content are being displayed (e.g., when SDR and HDR content are being simultaneously displayed, when SDR content and two types of HDR content are being simultaneously displayed, when two different types of HDR content are being simultaneously displayed, etc.). If desired, the soft clipping operations of block 112 may be applied to all content whether from compliant trusted sources or non-compliant untrusted sources.

In general, the tone mapping parameters that are used in specifying content-luminance-to-display-luminance mappings may include any suitable number of parameters (e.g., a black level associated with dark content, a reference white level, a skin tone level, gamma and/or slope levels, etc.). Tone mapping engine 24 can coordinate the display of SDR content, HDR content (following one or more, two or more, or three or more different standards), and/or other content either simultaneously, concurrently, or in one or more different combinations (e.g., SDR only, HRD only, SDR and HDR, SDR and HDR of a first type, SDR and HDR of a second type, HDR of first and second types, SDR with HDR of first and second types, HDR of the first type only, HDR of the second type only, etc.) using tone mapping parameters unique to each of these scenarios for all of the simultaneously displayed content and/or using different respective tone mapping parameters for each different type of content being simultaneously displayed in a different area of the display.

The foregoing is merely illustrative and various modifications can be made to the described embodiments. The foregoing embodiments may be implemented individually or in any combination.

What is claimed is:
1. An electronic device, comprising:
input-output circuitry including an ambient light sensor that measures an ambient light level and at least one input-output device with which a user brightness setting is gathered;
a display; and
control circuitry configured to:
generate first content having a first dynamic range;
generate second content having a second dynamic range that is larger than the first dynamic range;
in a first mode of operation, display the first content on the display without any of the second content using a first set of tone mapping parameters based at least partly on the ambient light level and the user brightness setting;
in a second mode of operation, display the second content on the display without any of the first content using a second set of tone mapping parameters that is different than the first tone mapping parameters and that is based at least partly on the ambient light level and the user brightness setting; and
in a third mode of operation, simultaneously display the first and second content in respective first and second areas of the display using respective third and fourth sets of tone mapping parameters that are different than the first and second sets of tone mapping parameters.

2. The electronic device defined in claim 1 wherein the control circuitry is configured to adjust the tone mapping parameters dynamically while transitioning from the first mode of operation to the second mode of operation over a transition period.

3. The electronic device defined in claim 1 wherein the transition period is 0 to 50 seconds.

4. The electronic device defined in claim 1 wherein the control circuitry is configured to generate the first, second, third, and fourth tone mapping parameters at least partly based on display power constraints.

5. The electronic device defined in claim 1 wherein the tone mapping parameters include at least three tone mapping parameters selected from the group consisting of: a black level, a reference white level, a specular white level, a skin tone level, a slope of a content-luminance-to-display luminance mapping curve, and a gamma of a content-luminance-to-display luminance mapping curve.

6. The electronic device defined in claim 1 wherein the control circuitry is configured to determine whether a content generator running on the control circuitry that is used in producing the second content is trusted.

7. The electronic device defined in claim 6 wherein the control circuitry is configured to apply a tone mapping to the second content in response to determining that the content generator is not trusted.

8. The electronic device defined in claim 7 wherein the tone mapping implements a soft clipping function in which $Y'=(c1*Y+c2)/(c3*Y+c4)$ where Y is an output luminance from the content generator, Y' is a remapped luminance from the tone mapping and $c1$, $c2$, $c3$, and $c4$ are values based on the tone mapping parameters.

9. The electronic device defined in claim 1 wherein the control circuitry is further configured to:
in a fourth mode of operation, simultaneously display the first content and third content in different respective areas of the display using respective fifth and sixth sets of tone mapping parameters that are different than the first and second sets of tone mapping parameters.

10. An electronic device, comprising:
an ambient light sensor;
an input-output device;
a display; and
control circuitry configured to:
gather an ambient light reading with the ambient light sensor;
gather a user-selected brightness setting with the input-output device;
based at least partly on the ambient light reading, the user-selected brightness setting, and information indicating that first content having a first dynamic range and second content having a second dynamic range that is larger than the first dynamic range is to be displayed on the display, generate a first set of tone mapping parameters for the first content and a second set of tone mapping parameters for the second content; and
simultaneously display first content in accordance with the first set of tone mapping parameters and second content in accordance with the second set of tone mapping parameters.

11. The electronic device defined in claim 10 wherein the first set of tone mapping parameters includes a first specular white level, wherein the second set of tone mapping parameters includes a second specular white level, and wherein the first and second specular white levels are equal.

12. The electronic device defined in claim 10 wherein the first set of tone mapping parameters includes a first specular white level, wherein the second set of tone mapping parameters includes a second specular white level, and wherein the first and second specular white levels are not equal.

13. The electronic device defined in claim 10 wherein the control circuitry is configured to adjust the first and second tone mapping parameters dynamically.

14. The electronic device defined in claim 10 wherein the control circuitry is configured to generate the first set of tone mapping parameters and the second set of tone mapping parameters at least partly based on display power constraints.

15. The electronic device defined in claim 10 wherein the control circuitry is configured to select the first and second sets of tone mapping parameters at least partly on a display characteristic of the display.

16. The electronic device defined in claim 15 wherein the display characteristic comprises a display characteristic selected from the group consisting of: a contrast ratio for the display, a bit depth for the display, and a maximum specular white level produced by pixels in the display.

17. The electronic device defined in claim 10 wherein the first set of tone mapping parameters includes a first specular white level, wherein the second set of tone mapping parameters includes a second specular white level, and wherein the control circuitry is configured to reduce the first and second specular white levels when transitioning the display from operating in a normal power mode to operating in a low power mode.

18. An electronic device, comprising:
an ambient light sensor;
an input-output device;
a display; and
control circuitry configured to:
generate first content having a first dynamic range;
generate second content having a second dynamic range that is larger than the first dynamic range;
gather an ambient light reading with the ambient light sensor;
gather a user-selected brightness setting with the input-output device;
in a first mode of operation, display the first content on the display without any of the second content using a first set of tone mapping parameters based at least partly on the ambient light level and the user brightness setting;
in a second mode of operation after the first mode of operation, display the second content on the display without any of the first content using a second set of tone mapping parameters that is different than the first tone mapping parameters and that is based at least partly on the ambient light level and the user brightness setting; and dynamically adjust the first tone mapping parameters over a transition time period to transition between from the first mode of operation to the second mode of operation.

19. The electronic device defined in claim 18 wherein the control circuitry is configured to:

analyze at least the second content to produce content statistics; and select the second set of tone mapping parameters based at least partly on the content statistics.

20. The electronic device defined in claim 19 wherein the a first set of tone mapping parameters includes a first black level, a first reference white level, and a first specular white level and wherein the second set of tone mapping parameters includes a second black level, a second reference white level, and a second specular white level.

21. The electronic device defined in claim 20 wherein the transition time period is between 0 and 50 s.

* * * * *